United States Patent [19]

Mosher

[11] Patent Number: 5,767,455
[45] Date of Patent: Jun. 16, 1998

[54] APPARATUS AND METHOD FOR CONTROLLING A VIBRATORY FEEDER IN A WEIGHING MACHINE

[75] Inventor: Oren A. Mosher, Castro Valley, Calif.

[73] Assignee: Upper Limits Engineering Co., Livermore, Calif.

[21] Appl. No.: 806,199

[22] Filed: Feb. 26, 1997

Related U.S. Application Data

[62] Division of Ser. No. 415,940, Apr. 3, 1995, Pat. No. 5,639,995.
[51] Int. Cl.$^6$ .......................... G01G 13/02; G01G 13/04
[52] U.S. Cl. .......................... 177/64; 177/119; 177/120; 177/121; 177/116
[58] Field of Search .......................... 177/116, 119, 177/120, 121, 64

[56] References Cited

U.S. PATENT DOCUMENTS

| | | | |
|---|---|---|---|
| 1,918,456 | 7/1933 | Dodge . | |
| 3,091,301 | 5/1963 | Stone | 177/1 |
| 3,648,136 | 3/1972 | Krajewski et al. | 318/128 |
| 3,918,539 | 11/1975 | Wise | 177/210 |
| 3,957,126 | 5/1976 | Hobart | 177/122 |
| 4,037,095 | 7/1977 | Howells et al. | 177/25.11 |
| 4,081,044 | 3/1978 | Allen | 177/103 |
| 4,111,272 | 9/1978 | Ricciardi et al. | 177/50 |
| 4,448,272 | 5/1984 | Keller et al. | 177/1 |
| 4,534,428 | 8/1985 | Mosher et al. | 177/1 |
| 4,548,287 | 10/1985 | Matsuura | 177/25 |
| 4,610,323 | 9/1986 | Chenoweth et al. | 177/25.18 |
| 4,821,782 | 4/1989 | Hyer | 141/83 |
| 4,880,106 | 11/1989 | Falconer et al. | 198/763 |
| 4,961,491 | 10/1990 | Falconer | 198/761 |
| 5,054,606 | 10/1991 | Musschoot | 198/761 |
| 5,074,403 | 12/1991 | Myhre | 198/761 |
| 5,158,170 | 10/1992 | Grengg et al. | 198/762 |
| 5,211,253 | 5/1993 | Davis, Jr. | 177/25.18 |
| 5,285,930 | 2/1994 | Nielsen | 177/122 |
| 5,365,768 | 11/1994 | Suzuki et al. | 73/1 R |

*Primary Examiner*—Michael L. Gellner
*Assistant Examiner*—Anh Mai
*Attorney, Agent, or Firm*—McCormick, Paulding & Huber

[57] ABSTRACT

Apparatus and methods are shown for controlling a weighing machine in which product is fed into one end a vibratable pan of a vibratory feeder and is discharged from the other end, for example into a weigh bucket. In a first embodiment, the amplitude of vibration of a pan is measured and is compared to a desired amplitude. The measured amplitude is compared to a desired amplitude, and the amplitude of vibration is adjusted by modifying an input signal to a vibrator attached to the pan until the measured amplitude equals the desired amplitude. In a second embodiment, a mechanism is included to stop the loading of product into a pan when a predetermined amount of product has been discharged from a pan into a weigh bucket, and the weight of product in the pan is monitored as additional product is discharged into the weigh bucket Only a preselected additional weight of product is subsequently discharged into the weigh bucket. A third embodiment involves at least two pans arranged in series, and the weight of product in the downstream pan is determined and monitored. The measured weight is compared to a desired weight of product in the downstream pan, and the amplitude of vibration of the upstream pan is adjusted, as needed, in a closed-loop manner to feed more or less product into the downstream pan to establish and maintain the desired weight in the downstream pan.

16 Claims, 7 Drawing Sheets

APPARATUS AND METHOD FOR CONTROLLING A VIBRATORY FEEDER IN A WEIGHING MACHINE

This is a divisional of application Ser. No. 08/415,940 filed on Apr. 3, 1995 now U.S. Pat. No. 5,639,995.

BACKGROUND OF THE INVENTION

The present invention is related generally to weighing machines, and more particularly to apparatus and methods for controlling vibratory feeders of weighing machines.

Weighing machines incorporating vibratory feeders are well-known for separating bulk product such as peanuts, candy, fruit, frozen chicken parts and other products into discrete amounts for subsequent packaging. These net weight machines are of two, general types, single bucket and combination weighing machines.

A typical net weight weighing machine includes one or more vibratory feeders arranged serially, that is up- or downstream relative to one another. By using more than one feeder, the bulk product is more discretely separated and distributed for weighing. A typical vibratory feeder includes a pan with a feed end into which product is loaded, an opposite or "discharge" end, and a mechanism for vibrating the pan. During a weighing cycle, bulk product to be weighed is loaded into a pan from a hopper assembly, a conveyor belt or from a preceding pan, and moves toward the discharge end as the pan vibrates. Discharged product falls into a downstream pan, or into the weigh bucket in the case of the pan immediately preceding the bucket or other accumulating device, and the product in the bucket is weighed. When a predetermined weight of product has been discharged into the bucket, the contents of the bucket are dumped into a discharge chute to be packaged in individual packages or containers.

A combination weighing machine typically includes vibratory feeders that operate in the same manner, but include a number of feeders, for example 10–14 feeders and respective buckets. Bulk product is selectively loaded from a central vibratory feeder and into each feeder, or each series of feeders. Then, the product moves toward a respective discharge end of each pan, and is discharged into a respective bucket, at which point the weight of product in each bucket is measured. Preferably, each bucket contains between one-fifth and one-third of the target weight of product. A processor scans the measured weights in the buckets, selects the combination of buckets whose total weight most nearly matches a target weight, and causes the emptying of the selected buckets into a discharge chute to be packaged.

In both machines, each of the vibrators for vibrating the pans vibrates at an amplitude of vibration in response to an input signal, such as is provided by an AC line. The vibrators are operated, and the pans are vibrated, over the course of a feed cycle in which a target weight of product is to be discharged into a weigh bucket. Each weighing cycle begins with an empty bucket. In a single bucket weighing machine, the vibrators are initially operated at a preselected voltage to produce a "bulk feed" rate for a first time period, and product is discharged from each pan until a first or "bulk set point" weight in the buckets is reached. The voltage is then reduced to provide a reduced amplitude of vibration and the feed rate, which is continued for a second time period. Alternatively, if the pan is a "split pan" type including a bulk feed trough and a dribble feed trough, an associated cut off is activated to stop discharge of product from the bulk feed trough during dribble feed. In a combination weighing machine, each vibrator is operated at a preselected voltage for the entire feed cycle. As the weight of discharged product in the bucket reaches the target weight, the discharge of further product is stopped either by stopping the vibrator or alternatively by activating a cutoff for the dribble feed trough A typical machine performs between about 15 and 60 feed cycles per minute. Accordingly, each tenth or other portion of a second that is saved results in substantially improved performance, for example by decreasing the amplitude and increasing the duration of dribble feed to more accurately discharge product or by increasing the cycles per minute of the machine.

In order to optimize the efficiency of these weighing machines, it is essential that the amplitude of vibration produced in a pan be identical from cycle to cycle, especially during dribble feed, and that the depth of product in a pan be as consistent as possible from cycle to cycle. These criteria are especially important in a single bucket system in which the target weight must be discharged in every bucket and after every cycle. With consistent product depth and amplitude of vibration, it is easier to achieve predictable and reliable feed rates and resulting target weights from cycle to cycle, since the vibrators can be operated at the bulk and dribble feed rates for substantially predetermined time periods.

Ideally, a given input voltage produces a corresponding amplitude of vibration, and thus a corresponding feed rate. However, identical input voltages tend to produce different amplitudes of vibration among vibrators, even among vibrators of the same make and model. Moreover, those familiar with the operation of voltage-sensitive equipment will recognize that the input voltage from a power line typically varies by as much as ten volts over the course of a single day, and it is therefore extremely difficult to repeatably provide a given input voltage over an entire day. The variations in input voltage produce drastic variations in amplitude of vibration of the vibrator and pan, and thus in feed rates of product from cycle to cycle and over the course of a day.

Previous attempts to control amplitude of vibration in a pan have operated in an "open loop" manner, that is without any consideration for the actual amplitude of vibration of a pan. In an operator adjusted system, an adjustable transformer is employed to alter the AC voltage applied to the vibrator. In another system, a microprocessor operates a phase-controlled, voltage-controlled relay. When less than a full voltage is applied to the relay, less than a full amplitude is produced by the vibrator. These systems do not operate in a linear manner, so that an adjustment to the transformer does not produce a proportionate adjustment to the amplitude of vibration of the vibrator.

Open loop controls have a number of shortcomings. As there is no provision for detecting and adjusting the input voltage in response to variations in the AC line voltage and as the above-noted ten-volt variation can result in drastically varied feed rates over the course of a day, it is virtually impossible to provide repeatability of a feed cycle from one cycle to the next There is likewise no provision to compensate for aging during the useful life of the springs of each vibrator. Consequently, a given voltage applied to a particular vibrator at different times over a period of several months will produce different amplitudes of vibration. Since the actual amplitude of vibration is not measured, open loop controls permit over-driving of a vibrator, during which the actual amplitude of vibration exceeds the structurally-designed-for amplitude, and can damage a feeder.

It is not possible using open loop controls to accurately control the amplitude of vibration during the dribble feed portion of each weigh cycle. As noted above, the firing delay control voltages used to adjust the amplitude of vibration are non-linear, and the same voltage applied to different vibrators produces different amplitudes of vibration. A slight drop in the control voltage win not produce a corresponding drop in the amplitude of vibration. Moreover, in those cases where the product that is "in-flight" is insufficient to achieve the target weight, it is difficult using open loop control to provide an amplitude of vibration that is smaller than that of the dribble feed and for a brief time period to discharge a small amount of additional product into the bucket. The signal that is small enough to produce a smaller vibration in one pan of a multi-stage feeder or the various feeders of a combination may not cause any vibration in the other pans.

In a combination weighing machine, even a very experienced operator cannot monitor 12–15 feeders and pans using open-loop controls to adjust the amplitude of each in order to optimize the machine over an eight-hour shift. In a multiple stage feeder, as employed in either a single bucket or a combination weighing machine, it is virtually impossible to tune the pans so that the same voltage produces identical amplitudes, and thus identical feed rates in the pans. Moreover, in machines employing multiple stage feeders, altering the control voltages for the vibrators of a feeder in a uniform manner never reliably produces proportional alterations in the amplitude of vibration in each vibrator. Accordingly, product tends to bunch in one feeder while another feeder does not have enough product, and inconsistent feed rates result.

In order for a weighing device coupled to the bucket to accurately weigh the amount of discharged product in the bucket, any product that is discharged just before the cut off must first fall from the discharge end of the pan and settle in the weigh bucket. The weigh bucket is several inches, and generally at least 6–8 inches, and usually more than 12 inches, below the discharge end, and has sloped sides leading into the bottom of the bucket. The "in-flight" time for the discharged product to fall 6–8 inches is about 0.2 seconds. The product must then slide into and settle in the bucket, which can require up to several additional tenths of a second. Thus, the total time after cut off for product to travel into and settle in the bucket is between 0.3 and 0.5 seconds. The appropriate preselected times for bulk feed and dribble feed can to a degree be roughly anticipated for free-flowing products such as rice and shelled sunflower seeds, which produce consistent fill curves so long as depth of product in the pan and the amplitude of vibration of the pan is consistent. This is not the case for relatively large piece products such as candy bars, lollipops and frozen chicken parts, in which the "fill curve" shows discrete upward steps as pieces are discharged into a bucket.

In the case of relatively large piece products, it is very difficult to match the actual weight of product in a bucket or selected buckets, and the target weight. This results from the "step" nature of the fill curve. As the target weight is approached, individual pieces should be discharged into the bucket. However, as previously noted, it takes up to about 0.5 seconds after discharge before an accurate weight can be established. It is extremely time-consuming and inefficient to stop the vibrators each time a piece is discharged in order to weigh the new amount of product in the bucket. Consequently, the vibrators continue to run, and by the time that the target weight of product is detected in the bucket, too many additional pieces may be discharged. The addition of product into a bucket over and above the target weight, or "giveaways" is also inefficient.

As noted above, it is important to maintain a constant depth of product in the pans, and especially in the pan which discharges into the weigh bucket. The constant depth of product, in conjunction with a constant amplitude of vibration, ensures consistent, repeatable and efficient feed rates.

Known apparatus and methods for attempting to maintain a constant depth of product in feeder pans utilize "leveling trays" or optical sensors. The apparatus includes at least two pans arranged in series. The first pan discharges product into the bucket, and the second pan is loaded from a conveyor or an upstream pan, and discharges product into the first pan. The leveling tray or optical sensor is located at the feed end of the first pan, and determines whether product has backed-up in the first pan to a predetermined point at or near the feed end. If so, the tray or sensor signals for a temporary stop to the discharge of product from the second pan into the first pan. These known devices do not determine the weight of product in the first pan, which is a more accurate indication of depth of product in the first pan.

It is accordingly an object of the present invention to provide a method and apparatus for controlling a vibratory feeder in a weighing machine in which the amplitude of vibration is controlled in a closed-loop manner, to accurately and repeatably control the feed rate of product to be weighed.

It is another object of the present invention to provide a method and apparatus for controlling a multi-stage vibratory feeder in a weighing machine to establish and maintain a desired feed rate of product from a downstream pan by monitoring the weight of product in the downstream pan and controlling the amplitude of vibration of the preceding pan in a closed-loop manner.

It is a further object of the present invention to provide a method and apparatus for controlling a vibratory feeder in a weighing machine to rapidly and precisely ascertain the amount of product in the bucket, in order to decrease the time required to complete each feed cycle.

SUMMARY OF THE INVENTION

The present invention is directed to apparatus and related methods for controlling various aspects of weighing machines that includes vibratory feeders.

According to one aspect of the present invention, an apparatus is provided for selecting the feed rate of product in a vibratory feeder of a weighing machine at different levels. The vibratory feeder has a feed pan in which product to be weighed is fed at a feed end of the pan, moved toward an opposite end as a vibrator drives the pan in response to an input signal, and discharged from the opposite end.

Sensor means is coupled to the pan for determining the actual amplitudes of vibration of the pan and for generating signals indicative of the actual amplitudes of vibration. A selector is provided for selecting desired amplitudes of vibration corresponding to desired feed rates and for generating signals indicative of the desired amplitudes.

A comparator is also provided, and compares the signals indicative of the actual amplitudes of vibration to desired amplitudes of vibration to determine differences between the signals. A control is also provided and communicates with the comparator and with the vibrator for adjusting the vibrator amplitude in accordance with the differences to obtain feed rates at various levels from the desired amplitudes.

In accordance with another aspect of the present invention, a method is disclosed for setting the feed rates of product in a vibratory feeder of a weighing machine at different levels, in which the vibrator has a pan into which product to be weighed is loaded at a feed end of the pan, moved toward an opposite end of the pan as a vibrator drives the pan in response to an input signal, and discharged from the other end of the pan, and the method includes the steps of: determining the actual amplitudes of vibration of the pan and generating signals indicative of the actual amplitudes of vibration; selecting desired amplitudes of vibration corresponding to desired feed rates and generating signals indicative of the desired amplitudes; comparing the signals indicative of the actual amplitudes of vibration to the signals indicative of the desired amplitudes of vibration to determine the differences between the signals; and adjusting the vibrator in accordance with the differences to obtain feed rates at different levels from the desired amplitudes of vibration.

In accordance with still another aspect of the present invention, another apparatus is shown and controls the feeding of product in a weighing machine from a product supply source into a pan of a vibratory feeder, moving the product towards an opposite end as a vibrator drives the pan in response to an input signal, and discharging the product into a weight scale.

The apparatus preferably includes a cut-off gate for temporarily stopping the feeding of product from the source into the vibratory feeder. A monitor of the apparatus monitors the weight of product in the feeder, and generates signals indicative of the monitored weight. The apparatus includes a control for stopping the vibratory feeder from discharging product from the pan into the scale when the change in signals indicative of the monitored weight exceeds a predetermined value.

In accordance with yet another aspect of the present invention, an apparatus is shown for controlling the feed rate in a weighing system having a multi-stage, vibratory feeder which includes at least a first pan and second pan upstream from the first pan. Product to be weighed is loaded into a feed end of the second pan, moved toward an opposite end of the second pan as a second vibrator drives the second pan in response to a second input signal, and discharged into the first pan, at which point the product is moved toward an opposite end of the first pan as a vibrator drives the first pan in response to a first input signal, and discharged from the opposite end of the first pan.

The apparatus includes a weight measuring device that is coupled to the first pan for measuring the actual weights of product in the first pan and for generating signals indicative of the actual weights. Also included is a selector for selecting desired weights of product in the first pan corresponding to desired feed rates and for generating signals indicative of the desired weights of product in the first pan. A first comparator of the apparatus compares the signals indicative of the actual weights of product in the first pan to the signals indicative of desired weights of product to determine the differences between the weight signals.

A first amplitude measuring device is coupled to the second pan for determining the actual amplitudes of vibration of the second pan and for generating signals indicative of the actual amplitudes of vibration of the second pan. An amplitude selector of the apparatus selects desired amplitudes of vibration of the second pan corresponding to desired feed rates in accordance with the differences between the weight signals and for generating signals indicative of the desired amplitudes of vibration of the second pan.

Also included in the apparatus is a second comparator for comparing the signals indicative of the actual amplitudes of vibration of the second pan to the signals indicative of the preselected amplitudes of vibration to determine differences between the amplitude signals. An adjusting device is provided and communicates with the second comparator, and adjusts the second vibrator in accordance with the differences between the amplitude signals to obtain desired feed rates from the second pan in order to establish and maintain the desired weights of product in the first pan.

In accordance with yet another aspect of the present invention a method is disclosed for controlling the feed rate in a weighing system having a multistage, vibratory feeder that includes at least a first pan and second pan upstream from the first pan and into which product to be weighed is loaded into a feed end of the second pan, moved toward an opposite end of the second pan as a second vibrator drives the second pan in response to a second input signal, and discharged into the first pan, at which point the product is moved toward an opposite end of the first pan as a vibrator drives the first pan in response to a first input signal, and discharged from the opposite end of the first pan, and the method includes the steps of: measuring the actual weights of product in the first pan and generating signals indicative of the actual weights; selecting desired weights of product in the first pan corresponding to desired feed rates and generating signals indicative of the desired weights of product in the first pan; comparing the signals indicative of the actual weights of product in the first pan to the signals indicative of desired weights of product to determine the differences between the weight signals; determining the actual amplitudes of vibration of the second pan and generating signals indicative of the actual amplitudes of vibration of the second pan; selecting desired amplitudes of vibration of the second pan corresponding to desired feed rates in accordance with the differences between the weight signals and generating signals indicative of the desired amplitudes of vibration of the second pan; comparing the signals indicative of the actual amplitudes of vibration of the second pan to the signals indicative of the preselected amplitudes of vibration to determine differences between the amplitude signals; and adjusting the second vibrator in accordance with the differences between the amplitude signals to obtain desired feed rates from the second pan in order to establish and maintain the desired weights of product in the first pan.

DETAILED DESCRIPTION OF THE PREFERRED EMBODIMENTS

Figure 1:
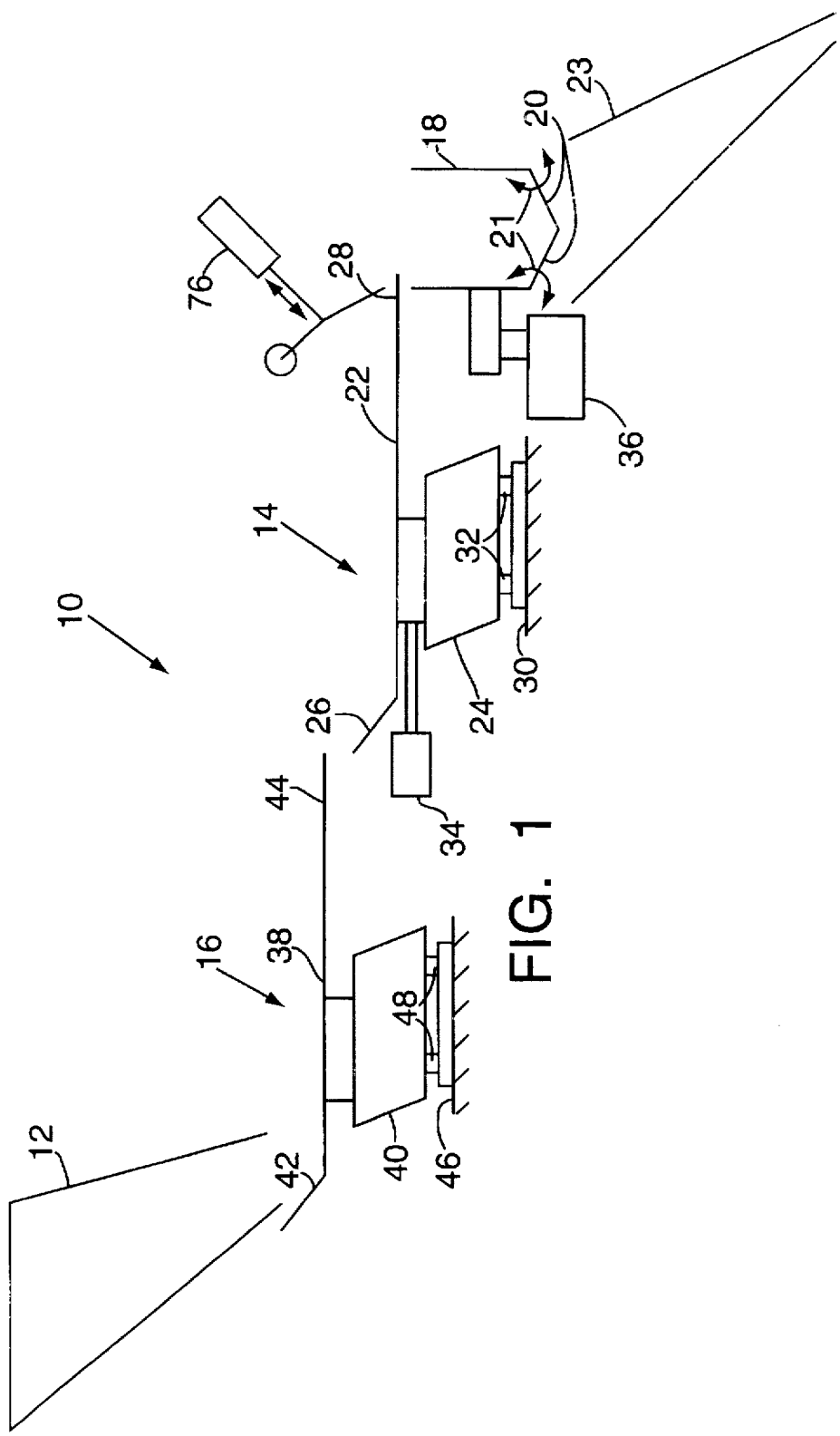
FIG. 1 is a schematic view of a net weighing machine in accordance with the present invention, including a two-stage vibratory feeder for separating and dumping bulk product into a weigh bucket.

Turning now to FIG. 1, a single bucket weighing machine for weighing bulk product is indicated generally by the reference numeral 10. Single bucket and combination weighing machines are generally known and used to divide bulk product such as rice, peanuts, candy, fruit or frozen chicken parts into discrete weight amounts for subsequent packaging. Although described here in the context of a single bucket weighing machine, the machine 10 shown in FIG. 1 might be one feeder of many feeders in a combination weighing machine, as is discussed further below.

Bulk product is loaded into a hopper assembly 12 by means of a conveyor (not shown) or other mechanism. The product is fed from the hopper assembly 12, through first 14 and second 16 vibratory feeders, and into a weigh bucket 18. As used herein, the terms "first", "second", etc., refer to the designation of a feeder apparatus upstream from the weigh bucket 18. Thus, the first feeder 14 is immediately upstream from the bucket, and is the feeder that discharges product into the weigh bucket 18, while the second feeder discharges product into the first feeder 14. While only two feeder apparatus are shown in FIG. 1, those skilled in the art will recognize that three or more feeders are also employed in a multi-stage single bucket weighing machines and may be employed in combination weighing machines as well.

The bucket 18 is mounted at and below the discharge end 28 of the first feed apparatus 14. The bucket 18 includes a set of doors 20 which are pivotable in the direction of the arrows 21, or includes other suitable apparatus for selectively emptying the bucket into a discharge chute 23 when a desired weight of product, as determined by a processor (not shown in FIG. 1), has been discharged into the bucket. In a single bucket weighing machine, the desired weight is usually the target weight. In a combination weighing machine, the desired weight is usually some portion, about one-fifth to one-third, of the target weight. The discharge chute 23 subsequently delivers product to a packaging machine (not shown) at which the product is loaded into and sealed in individual containers or packages.

The first vibratory feeder 14 includes a pan 22, which is mounted to a vibrator motor 24. The pan 22 includes a load end 26 into which product is loaded, and is moved by the vibration in the pan produced by the motor to a discharge end 28, from which product is discharged into and settles in the bucket 18. Product is loaded into the load end 26 of the first feeder 14 from the second feeder 16.

The motor 24 in turn is mounted to a base 30 via conventional rubber or spring isolation members 32, and includes a vibrating coil (not shown in FIG. 1) that vibrates in response to an input signal. Those skilled in the art will recognize that DC motors are also employed, and as is described below may be employed with the present invention.

An accelerometer 34 is coupled to the pan 22 to measure the acceleration of the pan, and is preferably oriented in a direction so as to measure the acceleration parallel to the direction of vibration. The acceleration of the pan 22 depends upon the amplitude of vibration of the pan, and the frequency or rate of the vibration. Preferably, the accelerometer 34 is of a micromachined or a silicon-based, strain gauge type, such as is manufactured by EG&G IC Sensors of Milpitas, Calif., and generates a signal indicative of the acceleration of the pan to which it is coupled. The generated signal indicative of the acceleration of the pan 22 is sent to the processor (not shown in FIG. 1) to which the accelerometer 34 is electrically coupled, as is more fully described below with respect to FIG. 2. As discussed further below, it is also possible to measure the displacement directly and to generate a signal corresponding to the actual amplitude of vibration.

A weight sensor 36 is coupled to the weigh bucket 18, and generates a signal indicative of the weight of product that has been discharged into the bucket. Those skilled in the art will recognize that a measurement of weight is most accurate after all of the product that is discharged into the bucket has settled in the bucket. The generated signal indicative of the weight of product in the bucket is also sent to the processor, which uses the signal to control the motor 24 depending which part of a feed cycle is being performed at any particular time.

The second feeder 16 is in many respects that same as the first feed apparatus 14, and includes a pan 38 which is mounted to a vibrator motor 40. In the second feeder 16 and as noted above, product is loaded into a load end 42 from the hopper assembly 12. Loaded product is moved by the vibration in the pan produced by the motor to a discharge end 44, from which product is discharged into the load end 26 of the first pan 22.

The motor 40 in turn is mounted to a base 46 via conventional rubber or spring isolation members 48, and includes a vibrating coil (not shown in FIG. 1) that vibrates in response to an input signal. For purposes of simplicity in FIG. 1, the second feed apparatus 16 is illustrated as not having an accelerometer, although as is described further below it may be desirable to provide an accelerometer that would operate in a manner as described above for the accelerometer 34 of the first feed apparatus 14.

Figure 2:
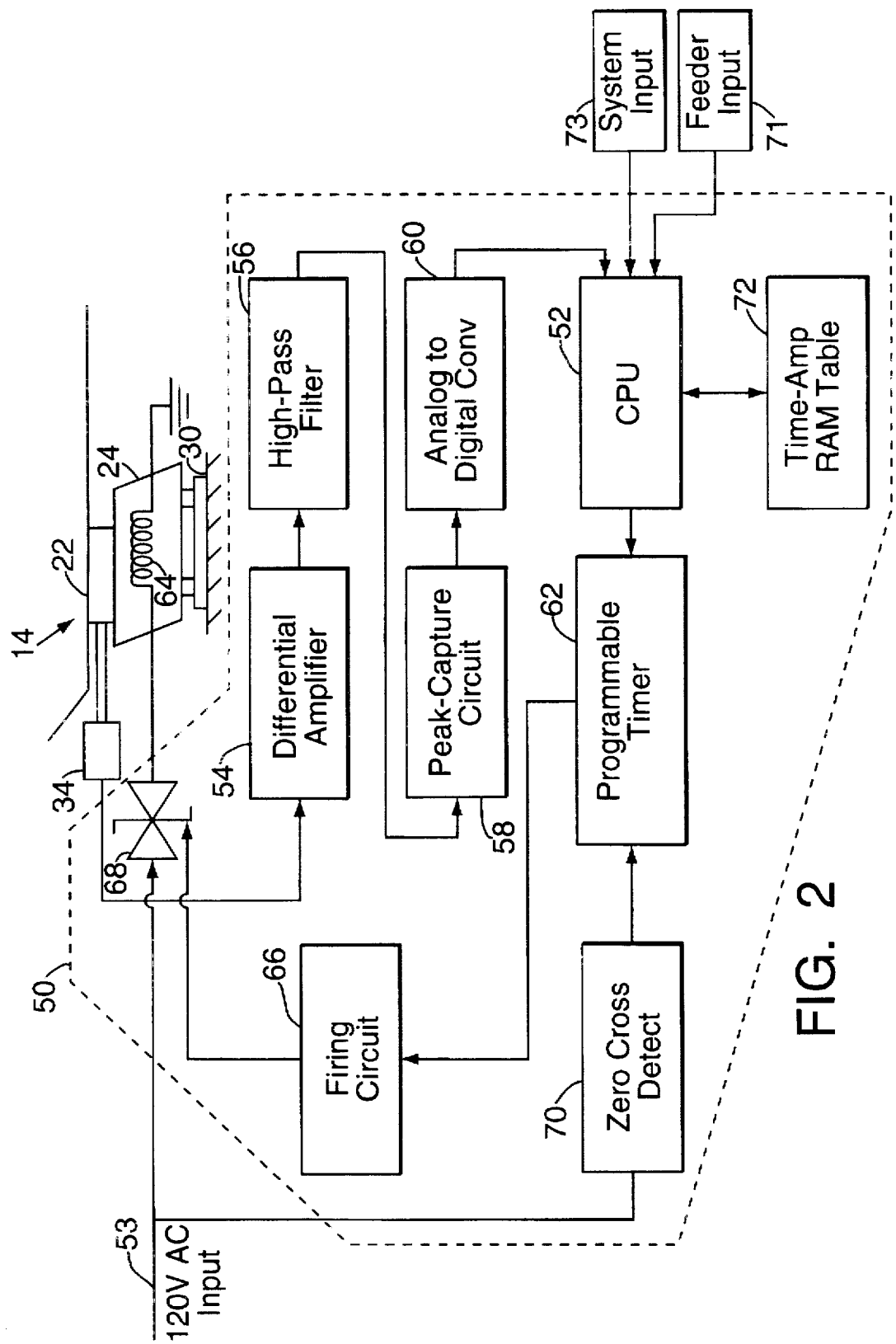
FIG. 2 is a schematic view of an embodiment of control circuitry for controlling the machine of FIG. 1 by controlling the amplitude of vibration of at least the pan which discharges product into the weigh bucket.
Figure 3:
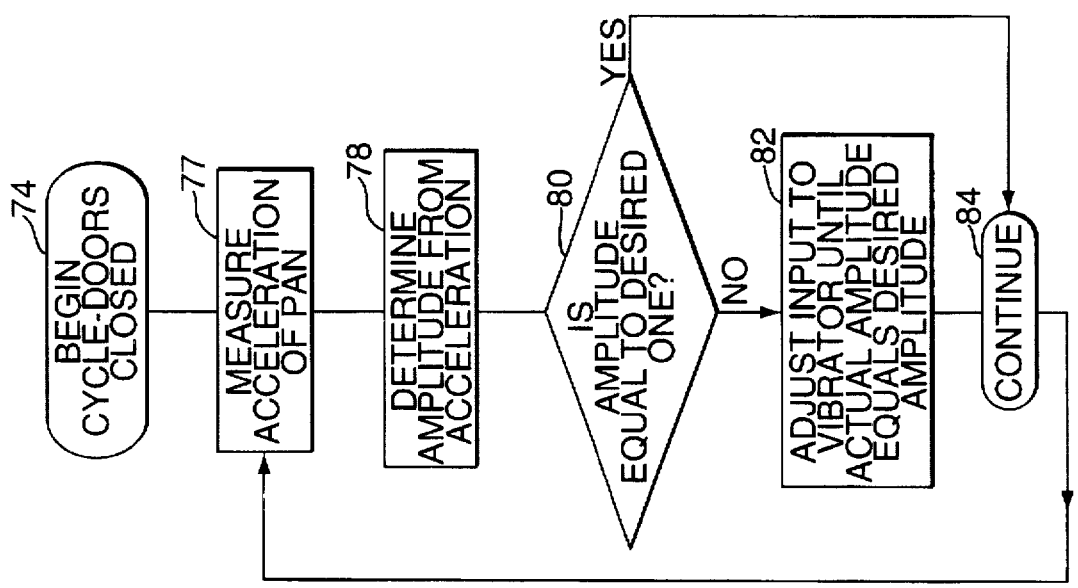
FIG. 3 is a flow chart illustrating a first method in accordance with the present invention for controlling the amplitude of vibration in a pan using the machine of FIGS. 1 and 2.

In FIG. 2, a control 50 (bound by dashed lines) for controlling the amplitude of vibration of the pan 22 is shown in more detail. While the control 50 is shown in FIGS. 1, 2 and 3 for controlling a single feed apparatus 14, the control may be used to simultaneously control several feeders of a multi-stage feeder, and is described further below. As noted above, the accelerometer generates a signal indicative of the measured acceleration of the pan 22, which signal is sent to a processor such as central processing unit (CPU) 52 or other processor. Those skilled in the art will recognize that the signal indicative of the measured acceleration includes noise such as is attributable to the AC line 53. Accordingly, the signal indicative of the measured acceleration must be processed prior to being used by the CPU 52.

As noted above and in an alternative structure to determine the actual amplitude of vibration of a pan, a displacement sensor (not shown) is coupled to the pan to measure the amplitude of vibration of the pan, and then generate a signal indicative of the actual amplitude of vibration of the pan. The signal indicative of the is then used by the CPU as described below. The displacement sensor may comprise a linear variable displacement transducer (LVDT) or a capacitive displacement device (CDD) which each require two reference points which move relative to one another. One reference point for LVDT or CDD is coupled to the vibratable pan, and the other point is coupled to a stationary object. With the pan at rest, the distance between the reference points for the LVDT or CDD is calibrated. The calibration must be performed each time the pan is changed, which may occur several times each day.

The preferred first step in processing the signal indicative of the acceleration is to pass the signal through a differential amplifier 54, a high pass filter 56 and a peak capture circuit 58 to obtain a corresponding signal generally indicative of the amplitude of vibration of the pan 22. The amplitude of vibration is obtained directly from the known relationship between measured acceleration on the one hand, and a known frequency of vibration on the other hand. For example, the relationship between displacement (d) and rotational speed ($\omega$) is expressed as follows: $d=k*\sin(\omega*t)$, where k is a constant equal to one-half of the total displacement, and $\omega=2*\pi*f$, with f=frequency, e.g., 60 Hz. Since "k" is a constant, the maximum value of "d", and the maximum displacement, occurs wherever the absolute value of sin ($\omega t$)=1, i.e., $\omega t=(n*\pi/2)$ radians, and n is an odd integer, e.g., 1, 3, 5, 7, etc. Thus, by taking the second derivative of vibration, the acceleration a is expressed by the equation $a=k*\omega^2$, and thus $k=a/\omega^2$. The differential amplifier 54, high pass filter 56 and peak capture circuit 58 are provided between the accelerometer 34 and the CPU 52, and receive the analog signal indicative of the acceleration of the pan. The peak capture circuit 58 determines the maximum acceleration from the signal indicative of the acceleration. The signal indicative of the maximum acceleration is used to determine a value of acceleration, from which the constant k is determined from the above relationship between acceleration and k. The displacement d, and thus the amplitude of vibration, is then determined using the known value of the constant k, and a signal indicative of the amplitude of vibration of the pan is generated. The signal indicative of the amplitude of vibration of the pan is still an analog signal, and must be digitized in order to be read by the CPU 52. Accordingly, the signal is passed through an analog-to-digital converter 60 to provide a digital signal indicative of the amplitude of vibration of the pan 22. As shown in FIG. 2, the A-D converter 60 is provided between the peak capture circuit 58 and the CPU to convert the analog signal indicative of the amplitude of vibration into a digital signal indicative of the amplitude of vibration.

Alternatively, a pair of integrator circuits and a low pass filter could be substituted for the differential amplifier 54, high pass filter 56 and peak capture circuit 58, to produce signals indicative of the actual vibrations of the pan from the signal indicative of the accelerations. The low pass filter serves to remove some of the noise due to movement of the pan and due to the signal from the AC line.

As shown in FIG. 2, the CPU 52 is coupled to a programmable timer 62, which in turn is coupled to a vibrator coil 64 of the motor 24 via a firing circuit 66, and a triac 68 which is normally shut off so that no power is transmitted to the coil. The timer 62 is preferably a model AM9513 manufactured by Advanced MicroDevices of Sunnyvale, Calif., and includes a clock input to its internal counters. For example, each count of a 100 kHz clock is equal to 10 microseconds ($10\times10^{-6}$ seconds), and a count of 440 is equal to a half-cycle of a 60 Hz signal. When a programmed time period has elapsed, the programmable timer 62 signals, for example using a single pulse of about 10 microseconds, the firing circuit 66 to turn the triac 68 on at a programmed time after the power signal of the AC line passes a zero-cross point, as is more fully described below. When it is turned on, the triac 68 permits the provision of power from the AC line to the coil 64, which vibrates in response to the application of power. As is described further below, the CPU 52 indirectly controls the firing circuit 66 and triac 68, and thus the portion of the input signal and amount of power that is applied to the coil, in accordance with the digitized signal indicative of the amplitude of vibration.

The programmable timer 62 is also coupled to the AC line 53 via a zero-cross detect circuit 70 of a known type. The zero cross detect circuit 70 detects the point at which a signal provided by the AC line 53 has a value of zero, and sends a corresponding signal indicative this condition to the timer 62. From the zero cross point, the programmable timer 62 measures the programmed time. When the programmed time is measured, the timer 62 signals the firing circuit 66 to turn the triac 68 on, and an input signal is provided to the coil 64 to vibrate the pan 22.

At some point prior to a feed cycle, or even during a feed cycle, the desired amplitude of vibration at which the pan should be vibrating is determined. The desired amplitude is provided, for example by the operator at a feeder input device, such as a keyboard 71 or from a weighing program. The input device 71 generates a setting signal indicative of the desired amplitude of vibration, which the CPU compares to the signal indicative of the actual amplitude of vibration, as described below. System information is input at a system input 73 or read from a memory storage device includes the frequency of the power signal, e.g., 60 Hz or 50 Hz, and a pace, which is a designated number of feed cycles per unit time for the weighing machine. The pace may be internal, for example controlled by a weighing program that is stored within the CPU. The pace is more likely to be externally controlled by a device that is coupled, electrically, mechanically or otherwise, to the weighing machine, such as the abovediscussed packaging machine.

As previously noted, the amplitude of vibration is related to the feed rate of product from a pan, and the feed rate in turn is related to the number of feed cycles per minute produced by the machine. Accordingly, it is possible to relate the number of cycles per minute to an appropriate amplitude of vibration. For example, if the weighing machine is producing more cycles per minute than a downstream packaging machine can package, i.e., the weighing machine is waiting for the packaging machine, then the weighing machine should be slowed down, and thus the amplitudes of vibration of the pans should be decreased by some value. Conversely, if the packaging machine is "waiting for" the weighing machine, then the weighing machine should be speeded up, and thus the amplitudes of vibration should be increased. By tying the weighing machine and a packaging machine, it is possible to have the weighing machine pace itself, to match the production of the packaging machine and to optimize the efficiency of each machine.

As is also described more fully below in accordance with a method of the present invention, the CPU 52 reads the digitized signal indicative of the amplitude of vibration of the pan 22. As noted above, an amplitude of vibration results in a feed rate of product that is discharged into the weigh bucket. A comparator of the CPU 52, or equivalent device, compares the signal indicative of the actual amplitude of vibration of the pan and the setting signal that represents the desired amplitude of vibration of the pan for the particular point in the feed cycle at which the actual amplitude is measured.

The CPU 52 communicates with a memory storage device such as a RAM 72, which includes a programmable look-up table of values in digital form concerning the relationship between amplitude of vibration in a pan and time period to be programmed into the timer 62. The look-up table includes information that is preprogrammed, or may be learned by varying the clock counts described above from zero, at which the triac is turned on immediately and a maximum amplitude of vibration is obtained, and increasing the clock counts until the measured amplitude of vibration is zero or some negligible value. The look-up tables may also be pan and/or product specific, so that a look-up table for a given pan and product may be recalled months after the look-up table was originally created. The CPU 52 or the RAM 72 also includes information concerning the appropriate feed rate at each given point during a feed cycle. The CPU 52 compares the actual amplitude of vibration as indicated by the digitized signal with the amplitude of vibration corresponding to the desired feed rate. If the actual and desired amplitudes are not identical, the CPU 52 sends and signal indicative of the correct programmed time to the programmable timer 62 in order to change the programmed time. The particular programmed time corresponding to the desired amplitude of vibration is read by the CPU 52 from the look-up table stored in the RAM 72. Those skilled in the art will recognize that an increase in the programmed time results in a decrease in the power provided to the coil 64, and thus results in a smaller amplitude of vibration and a slower feed rate. Conversely, a shorter programmed time results in a larger amplitude of vibration and feed rate.

As noted above, DC coils and motors are also employed. In the case of a DC coil, a divide by two circuit (not shown) is provided between the zero cross detect circuit 70 and the programmable timer 62.

At least initially, the look-up table includes an electronic chart of values of count versus anticipated amplitude of vibration In a typical chart, a higher count corresponds to a reduced amount of power provided to a vibrator. For example, in a 60 Hz environment, a count of 0 corresponds to the providing of maximum power to the vibrator, which result in a maximum amplitude of vibration, for purposes of this example 0.1 inch. In practice, the inductance of a typical AC coil causes current to flow for some time after the zero cross point, e.g., 22.5 milliseconds. Accordingly, there is no significant increase in amplitude of vibration if the triac is fired within about 200–250 counts after the zero cross point. Also accordingly, the look-up table only needs to store count values between about 200–833 for a 60 Hz environment. A count of 833 corresponds to one half of a cycle in the 60 Hz environment, and thus a providing of no power to the vibrator, and no vibration. The table may initially include counts corresponding to 0.001 inch increments in amplitude of vibration. As is discussed below, the table can be updated during feed cycles in the event that a count does not produced the anticipated amplitude of vibration for a given pan or a given product. The CPU overwrites the count value with a higher or lower value, as appropriate, and determines whether the desired amplitude of vibration is being produced using the new count value. The count value is adjusted again as needed until the desired amplitude of vibration is produced. Thus the look-up table is a learning memory in which the table values are updated according to the experience with the shift in count values or vibrator input signals.

If the count value required to produce the desired amplitude of vibration changes, it is necessary to adjust adjacent count values in the table to smooth the shift in count values resulting from change in count values for at least one desired amplitude of vibration. One manner of smoothing the adjacent count values is to decrease the adjustment in count values with each incremental increase from the desired amplitude. For example, if the desired amplitude is 0.050 inch, and the original count value of 400 is adjusted upwardly by 10 counts, the count corresponding to 0.049 inch is only adjusted upwardly by 9 counts, 0.048 by 8 counts and so forth, while the count for 0.051 is adjusted upwardly by 9 counts, 0.052 by 8 counts and so forth. Other adjustment formulae may be employed depending upon, for example the range amplitude of vibration of a feed cycle, or the pan or product being used in the feed cycle.

In accordance with a method of the present invention and with initial reference to FIG. 3, an exemplary feed cycle is described. Each feed cycle begins (block 74) with the dumping of the weigh bucket 18 of FIG. 1. As shown in FIG. 1, a cutoff 74 is activated just prior to emptying to prevent the discharge of further product into the bucket, the product settles in the bucket, and the doors 21 of the weigh bucket 18 pivot open to release the entire contents of the bucket into the discharge chute. Those skilled in the art will recognize that the cutoff 74 will affect any weight reading taken of the pan if it contacts a pan or urges product down into a pan. Accordingly, the cutoff is positioned so as to avoid contacting the pan or product in a manner which would effect a weight measurement.

After the doors 21 are closed, the cutoff 74 is retracted to allow the discharge of product from the discharge end 28 of the pan 22 into the bucket 18, and the CPU 52 of FIG. 2 sends a programmed time to the timer 62 to produce a desired amplitude of vibration corresponding to a desired feed rate. In FIG. 3, the accelerometer 34 measures the acceleration of the pan (block 76), and sends a signal indicative of the acceleration to the CPU 52. The signal indicative of the acceleration of the pan is processed (block 78) in the manner described above, e.g., by peak capture or by integration to produce a digital signal indicative of the actual amplitude of vibration of the pan 22. The CPU 52 reads the signal indicative of actual amplitude of vibration, which is then compared to the setting signal indicative of a desired amplitude of vibration (block 80) either from the input device 71 or from a feed cycle program.

If the actual amplitude of vibration equals the desired amplitude, then the vibrator is operating appropriately, at least for the particular point in the feed cycle at which the actual amplitude of vibration is determined, and the cycle continues (block 84) until it is again appropriate to measure the acceleration of the pan. However, if the actual amplitude differs from the desired amplitude, it is necessary to adjust the actual amplitude of vibration. The difference between the actual amplitude and the desired amplitude might occur for one or more reasons, such as a change in voltage in the AC line 53 or because the signal indicative of the weight of product in the bucket 18 and read by the CPU 52 indicates that a dribble feed portion of a feed cycle should begin. In addition and as will be recognized by those skilled in the art, the pan and the product are a tuned, resonant mechanical system, and thus the amplitude of vibration will vary with the total weight of the system. The actual amplitude is adjusted (block 82) by adjusting the programmed time provided to the timer 62 corresponding to the desired amplitude of vibration, as described above, to produce the desired amplitude. Then, the feed cycle continues (block 84)

until it is again appropriate to measure the acceleration. The appropriate time between successive acceleration measurements depends upon the frequency of the power, e.g., one-thirtieth of a second for 60 Hz, one-twenty-fifth of a second for 50 Hz, or some multiple thereof, and may be adjusted.

Figure 4:
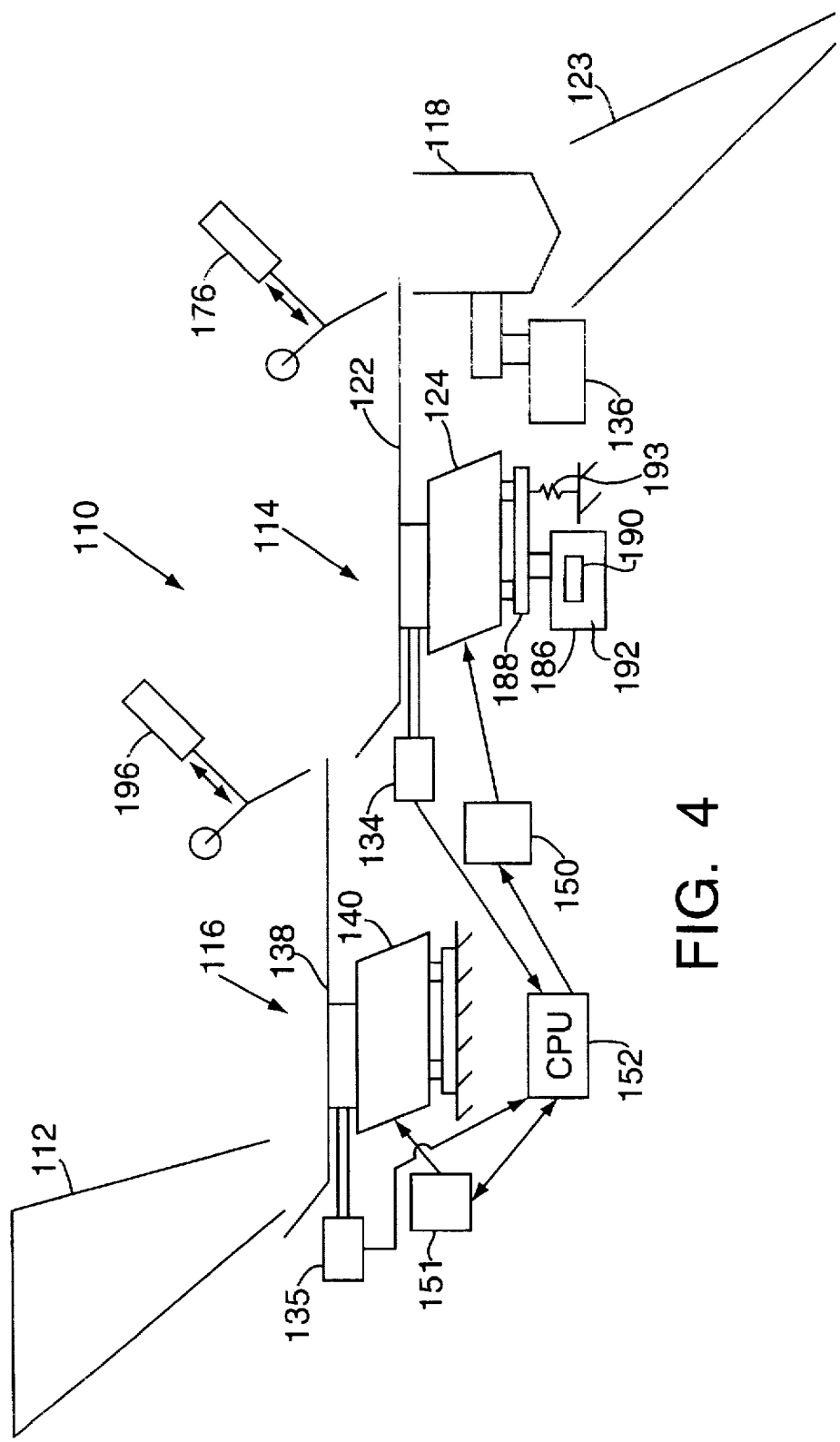
FIG. 4 is a schematic view of a second embodiment of a net weighing machine in accordance with the present invention similar to that shown in FIG. 1, and including a control for rapidly detecting the discharge of product from the pan of a feed apparatus into the weigh bucket.
Figure 5:
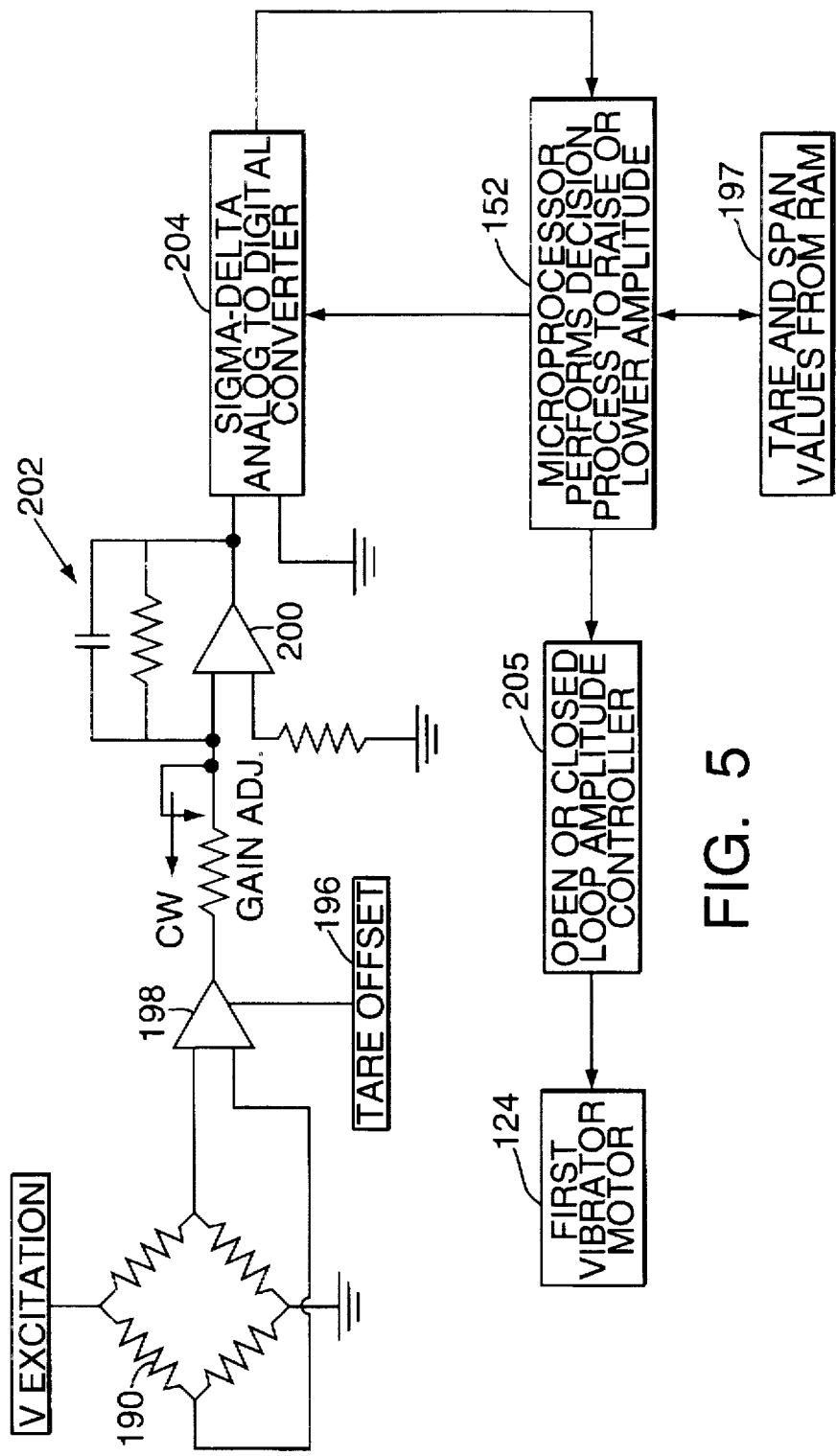
FIG. 5 is a schematic view of an embodiment of control circuitry for use in the machine of FIG. 4.

In FIGS. 4 and 5, another embodiment of a single bucket weighing machine is indicated generally by the reference numeral 110, and rapidly determines the weight of product discharged into the weigh bucket 118. Although described here in the context of a single bucket machine, the machine 110 shown in FIGS. 4 and 5 might be one feeder of many feeders in a combination weighing machine, as is discussed further below with respect to FIG. 9. The machine 110 is the same in many respects as the machine 10 described above. Accordingly, like reference numerals preceded by the numeral 1 instead of 0 are used to indicate like elements.

A weigh cell 186 is coupled to the motor 124 of the first vibratory feeder 114. The first feeder 114, including the pan 122 and motor 124, is mounted on a plate 188, which in turn is mounted on the weigh cell 186. The weigh cell 186 includes a strain gauge 190, such as model 9010 manufactured by Tedea Huntleigh of Canoga Park, Calif., which is preferably mounted in a viscous silicon damping fluid that fills a cavity 192 of the weigh cell. Those skilled in the art will recognize that is it desirable to utilize a strain gauge of a small capacity, which allows for the weighing of smaller amounts, e.g., 1–3 kilograms, of product in the pan. In order to use a small capacity strain gauge, a mechanical tare offset spring 193 is provided between the vibrator motor 124 and ground to compensate for the weight of the pan and motor. While the spring 193 is shown externally from the weigh cell 186 for purposes of clarity, those skilled in the art will recognize that the spring is usually located within a housing of the weigh cell 186. Thus during a feed cycle, the weigh cell 186 need not measure the combined weight of product in the pan 122, the pan, and the motor 124, but generates a signal principally indicative of the product weight alone, which is sent to a processor 152 (FIG. 5).

The weigh bucket 118 also includes a weigh cell 136, which weighs the amount of product discharged into the bucket and generates a signal indicative of the measured weight of product. The signal indicative of the measured weight is also sent to the processor, indicated at FIG. 5 at 152, which uses the signal indicative of the measured weight of product in the bucket to control the first 114 and second 116 vibratory feed apparatus, and a cutoff 176, as well as the application of bulk and dribble feed rates.

With reference to FIG. 5, the signal indicative of the measured combined weight of product and the pan includes a significant amount of noise attributable to the periodic nature of the AC signal that powers the vibrator motor 124 of the first feed apparatus 114. Some of the noise is the result of the vibration of the pan, which has a vertical component. In order to obtain a signal indicative of an accurate weight of product in the pan, most of the noise must be removed. The measured weight signal is passed through an instrumentation amplifier 198, such as model AD524 or AD624 manufactured by Analog Devices of Norwood, Mass., to amplify the signal, typically by about three orders of magnitude. An electrical null or zero weight offset 196, which is previously determined is applied at the signal output of the amplifier 198. The once-amplified signal is amplified for a second time using an operational amplifier 200 and a first order low-pass filter 202 to remove noise in the signal. While second order or higher filters may be used in this application, they add significant expense to the apparatus without significantly increasing the noise reduction. The low-pass filter 202 leaves some periodic noise in the filtered signal, with a typical corner frequency of about 40–100 Hz, corresponding to about 5–25 grams of noise in the filtered signal.

A "Sigma-Delta" type analog to digital converter 204, such as model AD7212 manufactured by Analog Devices of Norwood, Mass., is used to remove the periodic noise in the filtered signal, and integrates the filtered signal over exactly one period of the signal, e.g., 1/60th of a second in a 60 Hz environment. The period of the signal, and thus the appropriate sampling rate of the converter 204, is directed by the CPU 152. The periodic noise attributable to the pan movement is typically reduced by a 5–6 orders of magnitude, and the integrated signal indicative of the weight of product in the pan is accurate to within 0.1 grams, which is negligible compared to about 1–3 kilograms of product in a fully loaded pan. The tare and span values 197 are taken from the RAM or other memory storage device, where they are stored after tare and calibration cycles and are combined with the weight signal in the microprocessor 152. Periodically, for example depending upon the product being weighed, the vibrator is emptied of product and stopped, and a new tare value is taken, which is then stored in RAM for subsequent use. The calibration of contemporary weigh cells is quite stable. The new tare value may be obtained manually, but is preferably obtained automatically, by stopping loading of product into the pan to be tarred. A weigh cell is coupled to the pan, and the weight of product in the pan and the pan is monitored until there is no change for some time, about 1–2 seconds, at which point the measured weight corresponds to the new tare value, which is stored and used in subsequent feed cycles.

The digitized signal indicative of the weight of product in the pan 122 is used during the dribble feed portion of a feed cycle. The digitized signal corresponds to the actual weight of product in the pan at the time the weight in measured. The CPU 152 monitors the actual weight of product in the pan, and can detect the discharge of product and corresponding loss of weight in the pan within 0.1 (one-tenth) second, and more typically within about 1/30 (one-thirtieth) second. This shortened detection period is substantially quicker than the up to 0.5 second period necessary using only weigh cells attached to the weigh bucket, and results in correspondingly significant increases in machine efficiency. As described above, the CPU 152 controls the vibration produced by the first motor 124, preferably using a closed-loop control 205 as described above, although an open-loop control may be employed.

As previously noted, a given amplitude of vibration corresponds to a given feed rate of product from a pan. With reference to FIG. 4 and to accurately establish and maintain the desired weight of product in the first pan 122, a control 151 is coupled to the second pan 138 to control the amplitude of vibration of the second pan in a closed loop manner. An accelerometer 135 is coupled to the second pan 138, and generates signals indicative of the actual amplitudes of vibration of the second pan 138, which are processed as described above and read by the CPU 152. The signals indicative of actual amplitudes of vibration are compared to desired amplitudes of vibration in a look-up table, depending upon whether more or less product should be discharged into the first pan 122, which in turn depends upon whether the actual weight of product in the first pan 122 is less than or more than the desired weight. The CPU 152 then sends an appropriate signal to the control 151 to adjust the power provided to a second vibrator motor 140 to produce the desired amplitudes of vibration in the second pan 138.

In FIG. 4, the first pan 122 contains a desired weight of product during each feed cycle, and is illustrated as discharging product into the weigh bucket 118. A control 150, similar to the controls 151 and 50 described above, is coupled to the first pan 122 to control the amplitude of vibration in the first pan in a closed-loop manner. An accelerometer 134 coupled to the first pan 122 generates signals indicative of the actual amplitudes of vibration of the first pan 122, which are processed as described above and read by the CPU 152. The signals indicative of actual amplitudes of vibration are compared to desired amplitudes from a look-up table. The CPU 152 then sends an appropriate signal to the control 150 to adjust the power provided to a first vibrator motor 124 to produce the desired amplitudes of vibration in the first pan 122. The desired amplitudes of the first pan 122, coupled with the fact that a substantially constant, desired weight of product is provided in the first pan, results in predictable, consistent rates of discharge of product from the pan into the weigh bucket 118.

Figure 6:
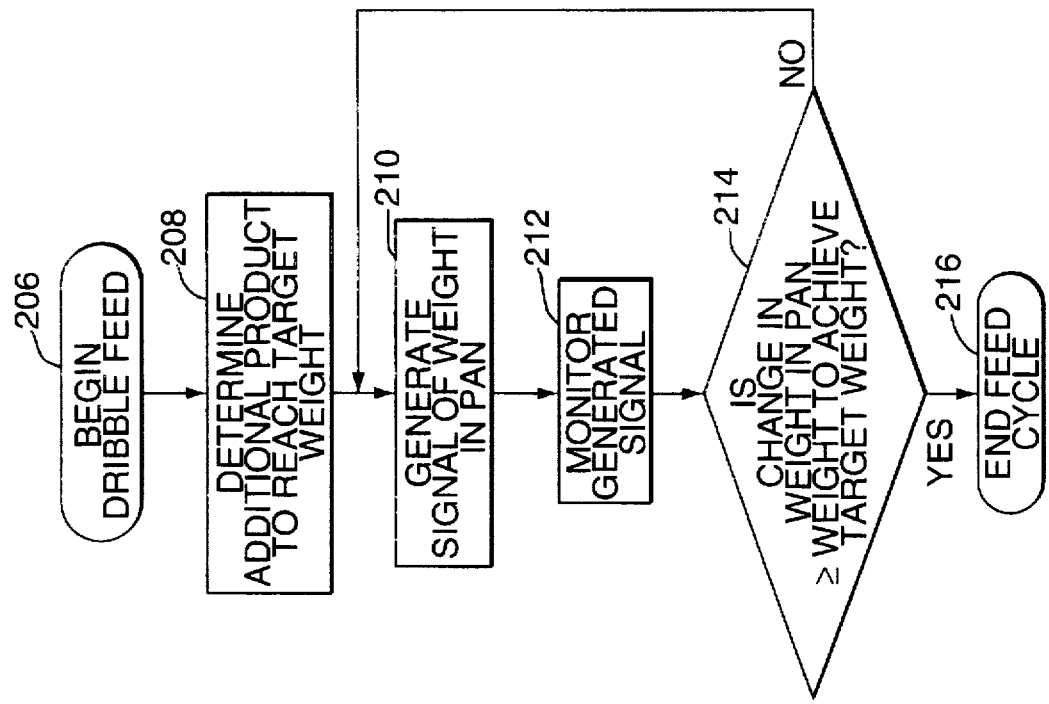
FIG. 6 is a flow chart illustrating a second method in accordance with the present invention for rapidly ascertaining the weight of product discharged into the bucket using the machine of FIGS. 4 and 5.

In accordance with a method of rapidly determining the weight of product discharged into the weigh bucket of a weighing machine, and with reference to FIG. 6, a feed cycle for a net weigh machine is performed as described above until the beginning of the dribble feed portion (block 206), which is started when the signal generated by the weigh cell 136 indicates that a predetermined weight of product has been discharged into the bucket 118. This point is referred to as the "bulk set point". At the beginning of the dribble feed portion of the feed cycle, the cutoff 194 (FIG. 4) is activated to stop the discharge of product from the second pan 138 into the first pan 122. Thus, the weight of product in the first pan 122 will be at a maximum value at or near the beginning of the dribble feed portion of a feed cycle. The weigh cell 186 coupled to the first pan 122 measures the combined weight of the product in the pan 122, of the pan and of the motor 124, and generates a corresponding signal which is then processed to produce a signal indicative of the weight of product in the pan 122, as is described above.

Simultaneously with or after the beginning of the dribble feed portion of a feed cycle in a single bucket weighing machine, the CPU 152 evaluates the signal indicative of the weight of product in the bucket 118 and determines how much additional product must be discharged from the pan 122 to reach the desired weight, such as the target weight, of product in the bucket (block 208). In a combination weighing machine, described below, product is fed at a single feed rate for the entire feed cycle until some fraction of the target weight has been discharged from the pan.

The weigh cell 186 associated with the pan 122 generates a signals indicative of the weight of product remaining in the pan (block 210), which are monitored by the CPU 152 as dribble feed continues (block 212). Each time that the CPU receives a signal indicative of the weight of product remaining in the pan, it determines whether the weight of product discharged from the pan is sufficient, when added to the weight of product in the bucket 118, equals the desired weight (block 214). If not, then product feed continues, and the steps of generating a signal indicative of product in the pan and of monitoring the generated signal are periodically repeated. As additional product is discharged from the pan, the CPU determines whether the desired weight of product has been discharged from the pan, and thus into the bucket, and if so ends the feed cycle (block 216) by stopping the vibrator motor 124 and/or activating the cutoff 176 associated with the first feed apparatus 114.

The embodiment of the present invention illustrated in FIGS. 4, 5 and 6 is particularly useful for separating product such as candy, fruit, frozen chicken parts and other large piece products. As noted above, the fill curve for large piece product is characterized by discrete steps as pieces are discharged from a pan. Accordingly, for large piece products, the weight of each discharged piece of product can be detected and measured within 0.1 second of discharge from the pan. In comparison to the above-noted 0.5 second necessary to detect a discharged piece of product using prior apparatus, the present invention provides a significant time savings, and thus results in higher throughput of product per period of unit time.

Figure 7:
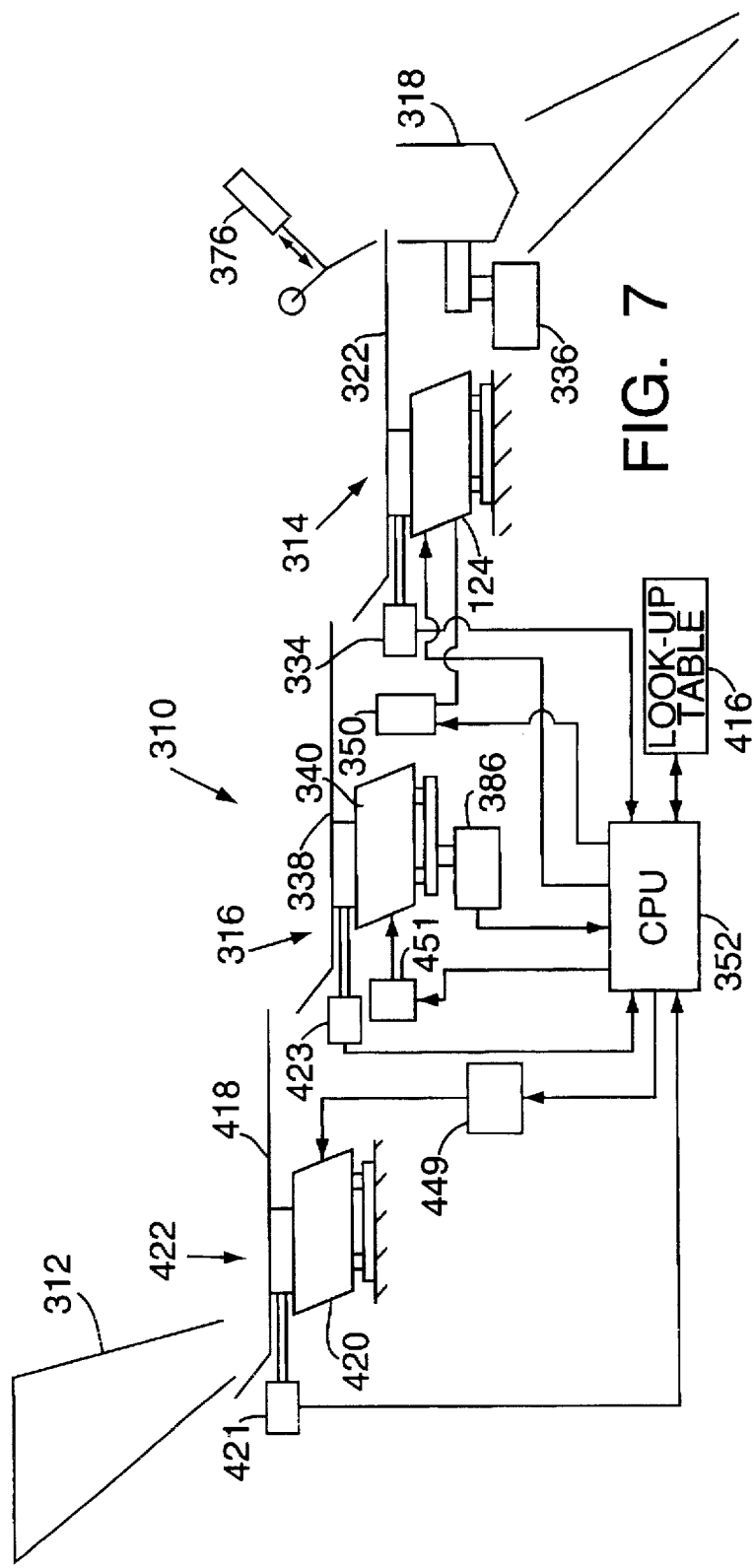
FIG. 7 is a schematic view of a third embodiment of a net weighing machine in accordance with the present invention similar to that shown in FIGS. 1 and 4, and including a control for providing a constant depth of product in at least the pan immediately upstream of the pan that discharges product into the weigh bucket, as well as closed loop control of the amplitude of vibration of each pan.

In FIG. 7, another embodiment of a single bucket weighing machine for weighing bulk product is indicated generally by the reference numeral 310, and is used to provide a constant depth of product in a pan, especially in the pan that discharges product into the weigh bucket 318. The machine 318 also provides closed-loop control of each vibrator, so that the amplitude of vibration of each pan can be simultaneously adjusted, as necessary, during a feed cycle. As noted above, it is preferable that during each feed cycle a constant depth of product is produced and maintained in each pan, so that predetermined amplitude(s) of vibration produce predictable and consistent feed rates from cycle to cycle. By maintaining a preselected weight of product in the second pan 338, a consistent amount of product is provided to the first pan 322 when a constant amplitude of vibration is maintained in the second pan, which in turn helps maintain a constant flow of product into and from the first pan 322. Although described here as used in a single bucket machine, the machine 310 shown in FIG. 7 might be one feeder of many feeders in a combination weighing machine, as is discussed further below. The machine 310 is the same in many respects as the machines 110 described above. Accordingly, like reference numerals preceded by the numerals 3 and 4, instead of 1 and 2, respectively are used to indicate like elements. The machine differs from the machine 110 in that a weigh cell is coupled to the second feeder 316 to monitor the weight of product in the second pan. In the embodiment illustrated in FIG. 7, a three stage feeder is shown, although those skilled in the art will recognize that two (as shown and described above) or four or more stages may also be employed. In the case of a two stage feeder, the upstream pan is supplied with product from a conveyor or other suitable device.

A weigh cell 386 of the same type as the weigh cell 186 described above is coupled to the motor 340 of the second feeder 316 in the same manner as previously described. During a feed cycle, the weigh cell 386 measures the combined weight of product in the pan 338, of the pan and of the motor 340, and generates a signal indicative of the combined, measured weight. The signal is processed in the same manner as previously described, and is read and monitored by the CPU 352.

An accelerometer 423 is coupled to the second pan 338, and preferably accelerometers 334 and 421 are also coupled to the first pan 322 and the third pan 418, in the same manner as described above, and each generates signals indicative of the accelerations of respective pans. The signals indicative of the respective accelerations are processed as previously described to determine the actual amplitudes of vibration of the first, second and third pans, which signals are read by the CPU 352. Closed-loop controls 350, 449 and 451 similar to the control 50 described above are also coupled to the first, second and third pans 322, 338, and 418 respectively, and operate in a manner as described above. The CPU 352 communicates with all three feed apparatus 314, 316 and 422, and closed loop controls 350, 451, 449 to provide known amplitudes of vibration in each pan. Such an arrangement permits identical or substantially identical adjustments in amplitudes of vibration for each pan, which in turn permits corresponding adjustments in feed rates from each pan.

The CPU 352 is also connected to a memory storage device 416 having look-up tables that store, in digital form, preselected weight of product versus amplitudes off vibrations of the pans, and a table at least for weight of product in the second pan 338 versus amplitude of vibration (or feed rate) of the third pan. The desired amplitude of vibration of the second pan 338 in turn depends upon the feed rate of the first pan 322. Ideally, the feed rate of product from the second pan 338 will match the feed rate of product from the first pan 322. Accordingly, the memory storage device also includes look-up tables that store, in digital form, tables of desired amplitudes of vibration versus counts for each feeder, and may include product-specific look-up tables for each feeder.

The CPU 352 compares the actual weights of product in the second pan 338 and the desired weights, and the actual weight will either be greater, equal to or less than the desired weight. If the actual weight is equal to, or at least within some acceptable range of the desired weight, the operation continues on unchanged. Ideally, the actual weights of product in the second pan will match the desired weight during the entirety of each feed cycle. If the actual weight is lower then the desired weight, the CPU 352 sends an appropriate signal to the control 449 to increase the amplitude of vibration in the third pan 418, and thus to load more product into the second pan 338 so that the actual weight in the second pan matches the desired weight. If the actual weight is greater than the desired weight, the CPU decreases the amplitude of vibration in the third pan. Those skilled in the art will recognize that it is important to maintain a steady flow of product through the feeders, and thus adjustments to the amplitude of vibration in the third pan is made every fraction of a period, e.g., every one-thirtieth of a second in a 60 Hz environment.

Figure 8:
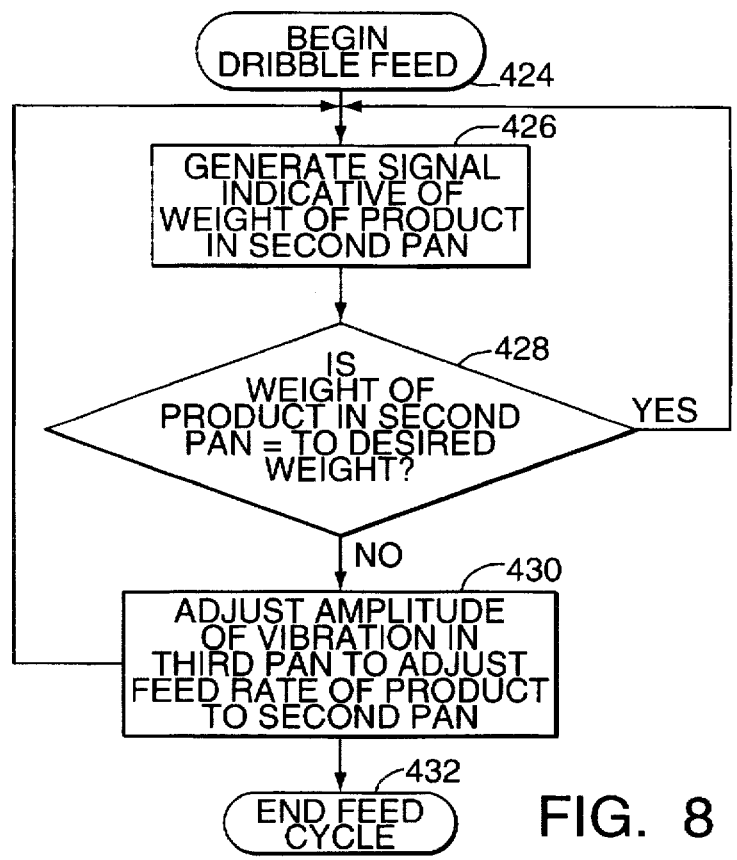
FIG. 8 is a flow chart illustrating a third method in accordance with the present invention for providing a constant depth of product in the pan immediately upstream of the pan that discharges product into the weigh bucket using the machine of FIG. 7.

In accordance with a method of controlling a weighing machine to provide a constant depth of product in a pan, and with reference to FIG. 8, a feed cycle begins (block 424) by vibrating the pans 322, 338 and 418 of FIG. 7 under the control of the CPU 352. Preferably, all three pans are operated to vibrate at a given ratio of amplitude of vibration, relative to one another, so that each pan discharges a consistent amount of product into the next pan or into the weigh bucket 318. The weigh cell 386 generates a signal indicative of the weight of product in the second pan 338, of the second pan and of the second motor 340, which is processed as described above to produce a signal indicative of the weight of product in the second pan (block 426). The CPU 352 compares the actual weight of the product in the second pan 338 to a desired weight that should be then-present in the second pan (block 428). If the actual weight equals the desired weight, or is acceptably close to the desired weight, then the feed cycle continues unchanged, and weight signals are periodically generated and compared to the desired weight. If and when the actual weight differs from the predetermined weight, the CPU 352 signals (block 430) the third motor 420 to adjust the amplitude of vibration in the third pan 418 to discharge more or less product into the second pan, as appropriate, so that the actual weight of product in the second pan more closely approximates or equals the desired weight. This process continues until the end of a feed cycle (block 432), and is repeated during successive feed cycles.

Figure 9:
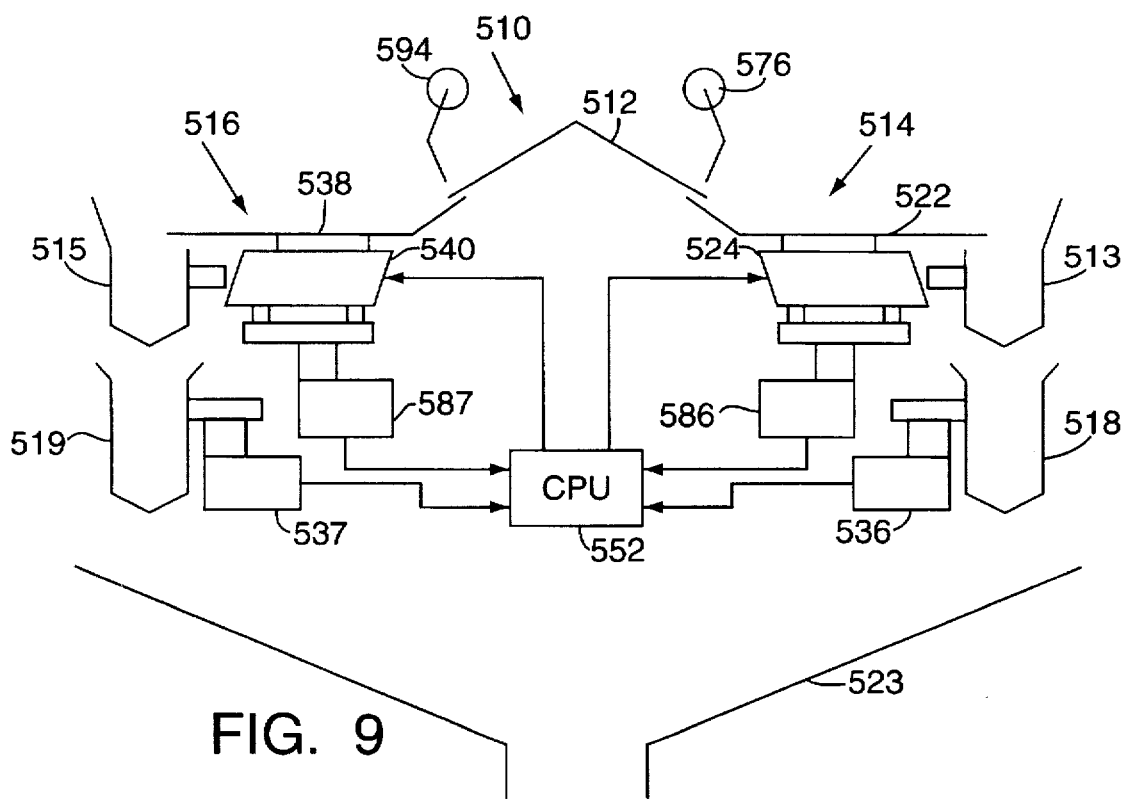
FIG. 9 is a schematic view of an embodiment of the invention similar to the embodiment shown in FIGS. 4, 5 and 6, and as used with a combination weighing machine.

In FIG. 9, an embodiment of a combination weighing machine is indicated by the reference numeral 510, and monitors weigh loss of product in each of a plurality of pans (only two shown) that discharge product into buckets 518, 519. The machine 510 may also provides closed-loop control of each vibrator (not shown) so that the amplitude of vibration of each pan can be simultaneously adjusted, as necessary, during a feed cycle. The machine 510 is the same in many respects as the machine 310 described above. Accordingly, like reference numerals preceded by the numerals 5 and 6, instead of 3 and 4, respectively are used to indicate like elements.

The machine 510 includes a conical vibratory product supply 512 of known construction, which feeds product into each of a number of vibratory feeders 514, 516 (only two shown). Product is selectively fed from the supply 512 to the feeders 514, 516 via cut-offs 576, 594, and from the feeders 514, 516 into accumulators 513, 515. The actual weights of product in the feeder pans 522, 538 is monitored by weigh cells 586, 587, and as described below at some point the contents of the accumulators are dumped into weigh scales 518, 519. Each weigh scale 518, 519 determines the actual weights of product in the weigh scale, and generates signals indicative of the actual weights, which are processed as described above and read by a CPU 552, which in turn dumps the contents of one or more of the buckets 518, 519 into the discharge chute 523 for subsequent packaging.

While the operation of only one feeder 514 is described below, each of the feeders 514, 516 operates in the same manner. The associated cutoff 576, 594 is retracted to load product from the source 512 into the each pan 522, 538. The weight of product to be loaded into the pan is substantially larger, e.g., twice as large as, than the weight of product to be discharged from the pan during a feed cycle. For example, each feeder in a combination weighing machine should discharge about one-fifth to one-third of the target weight for the feed cycle. Since a weight of product loaded into a pan need not precisely match the predetermined weight, the loading of the product into the pan is preferably performed by allowing product to be loaded from the conical feeder for a predetermined time. Preferably, and specially with large piece product, the weight of product in the pan is monitored during loading of product into the pan, and the loading is stopped at some predetermined weight. It may be desirable to provide a cutoff (not shown) at the discharge end of each pan 522, 538 so that no product is discharged from the pan until after the loading of product is completed.

Once product is loaded into each pan at the beginning of and during a feed cycle, the CPU 552 reads the signal produced by each weigh cell 586, 587 that is indicative of the weight of product in each pan 522, 538, and monitors the weight. Each motor 524, 540 is activated, and a cutoff at the discharge end of the pan is retracted, to discharge product from each pan 522, 538 into a respective accumulator 513, 515, while the CPU 552 continuously monitors the loss of weight of product in each pan. It may be desirable to reduce the amplitude of vibration as the feed cycle progresses, and the desired weight of discharged product is approached. When the CPU 552 determines from the signals indicative of the weights in the pans that a weight of product equal to a desired weight, e.g., one-fifth of the target weight, has been discharged, the CPU shuts off the vibrator to stop the discharge of product from the pans. Typically, cut off will occur just prior to the desired weight, as some product will be in-flight between the pan and the bucket. Then, the cutoff 576 or 594 between the conical feed and the pan 522 or 538 is retracted to load product from the conical feeder to the pan 522. The accumulators are emptied into respective weigh scales 518, 519, the weights of discharged product in the buckets are determined and compared to the target weight and with the weights in other buckets, and are eventually dumped with one or more other buckets into the discharge chute 523 to be packaged. In the event that the bucket is not dumped for longer than a predetermined number of cycles, e.g., fifteen, it is desirable to discharge a small amount of additional product into the bucket.

From the foregoing, novel apparatus and methods for controlling vibratory feeders of weighing machines have been disclosed in some detail. However, as will be recognized by those skilled in the art, numerous modifications and substitutions can be made without departing from the spirit of the invention or the scope of the appended claims. For example and as noted above, the various embodiments may be combined to control various aspects of weighing machines. Accordingly, the present invention has been described in several preferred embodiments by way of illustration rather than by limitation.

What is claimed is:

1. An apparatus for controlling the feeding of product in a weighing machine from a product supply source into one end of a pan of a vibratory feeder, moving the product towards an opposite end of the pan as a vibrator drives the pan in response to an input signal, and discharging the product from the opposite end of the pan into a weigh scale, the apparatus comprising:

means for temporarily stopping the feeding of product from the source into the pan of the vibratory feeder;

means for monitoring the weight of product in the pan of the feeder and for generating a signal indicative of the monitored weight when the feeding of product from the source has stopped; and control means for stopping the vibratory feeder from discharging product from the opposite end of the pan into the scale when a change in the signal indicates a drop of the monitored weight by a predetermined value.

2. An apparatus as described in claim 1, wherein the weigh scale has a weigh bucket and generates signals indicative of the weight of product in the weigh bucket, and the control means also monitors the signal indicative of the weight of product in the weigh bucket for activating the means for monitoring when the signal indicative of the weight of product in the weigh bucket reaches a preselected value.

3. An apparatus as described in claim 2, wherein a sum of the weight of product corresponding to the signal indicative of the predetermined value and the weight of product corresponding to the signal indicative of the preselected value substantially equals a desired weight of product.

4. An apparatus as described in claim 1, wherein the weighing machine includes means for feeding product from the source into one end of a pan of an additional vibratory feeder, moving the product towards an opposite end of the feeder as an additional vibrator drives the additional pan in response to an additional input signal, and discharging the product into an additional weigh scale, the apparatus further comprising:

means for temporarily stopping the feeding of product from the source into the additional vibratory feeder; and means for monitoring the weight of product in the additional feeder and for generating a signal indicative of the monitored weight of product in the additional feeder when the feeding of product from the source is stopped and wherein the control means stops the additional vibratory feeder from discharging product from the additional pan into the additional scale when the change in the signal indicates a drop of the monitored weight of product in the additional vibratory feeder by a predetermined value.

5. An apparatus as described in claim 1, wherein the means for stopping the feeding of product from the source into the feeder stops the feeding of product into the feeder after a predetermined feeding period.

6. Apparatus as described in claim 1 wherein:

the weigh scale has a weigh bucket and generates a weight signal indicative of the actual weight of product in the bucket; and the control means is connected to receive the actual weight signal for determining the predetermined value from a desired weight of product in the bucket and the actual weight of product in the bucket.

7. A method for controlling the feeding of product in a weighing machine from a product supply source through a pan of a vibratory feeder, as a vibrator drives the pan in response to an input signal from a power source, and causes the product to be discharged from the pan into a weigh scale, the method comprising the steps of:

temporarily stopping the feeding of product from the supply source into the pan of the feeder;

monitoring the weight of product in the pan and continuously generating a signal indicative of the measured weight of product in the pan after the step of temporarily stopping; and stopping the feeder from discharging product from the pan into a scale when it is determined during the step of monitoring the weight of the product in the pan that a change in value of the signal indicates the weight of product in the pan has dropped by a predetermined value.

8. A method as described in claim 7, further comprising the steps of:

measuring the actual weight of product in the bucket and generating signals indicative of the actual weight;

monitoring the signals indicative of the actual drop in weight of product in a bucket of the weigh scale; and performing the step of stopping the loading of product into the vibrator when it is determined during the step of monitoring that the weight of product in the bucket is a preselected value.

9. A method as described in claim 8, wherein the sum of the weight corresponding to the preselected value detected during the step of monitoring the actual weight of product in the bucket and the weight corresponding to the predetermined value detected during the step of monitoring the signal indicative of the weight of product in the pan substantially equals a desired value.

10. A method as described in claim 8, further comprising the step of:

adjusting the input signal to the vibrator after it is determined during the step of monitoring the signal indicative of the actual weight of product in the bucket that the signal indicative of the actual weight of product in the bucket is the preselected value.

11. A method as described in claim 7, wherein the weighing machine includes at least one additional vibratory feeder for feeding product from the source through another pan of the additional vibratory feeder, as an additional vibrator drives the additional pan in response to an additional input signal, and causes the product to be discharged from the pan into an additional weight scale, the method for further comprising the steps of:

temporarily stopping the feeding of product from the source into the additional pan; and monitoring the weight of product in the additional pan and for generating a signal indicative of the monitored weight of product in the additional pan after the step of temporarily stopping, and stopping the additional pan from causing product to be discharged from the additional pan into the additional scale when the change in the signal indicative of the monitored weight of product in the additional pan indicates a drop in weight by a predetermined value.

12. A method as described in claim 11, wherein the step of stopping the feeding of product from the source into the feeder is performed after a predetermined feeding period.

13. A method as described in claim 7, further comprising the step of:

dumping product from the weigh bucket after the step of stopping the feeder from feeding product from the pan into the scale.

14. A method as described in claim 13, further comprising the step of:

resuming the loading of product into the pan during the step of dumping product from the bucket.

15. The method of claim 7 further including the steps of generating a signal indicative of the weight of product discharged from the pan into the weigh scale; and determining the predetermined value, at which the discharging of product from the pan into the scale is stopped, from the signal indicative of the weight of product discharged into the weigh scale and a desired weight of product.

16. A method of controlling feeding of product in a weighing machine from a product supply source through a pan of a vibratory feeder as product is discharged from pan to a weigh scale, the method comprising the steps of:

temporarily stopping the feeding of products from the supply source into the feeder pan; and thereafter simultaneously measuring the weight of product in the pan and the weight of product in the weigh scale and determining the difference between the weight of product in the weigh scale and a desired weight of product; and then monitoring the weight of product in the pan to determine the additional weight of product discharged from the pan into the weigh scale; and stopping the discharging product from the pan into the weigh scale when the additional weight of product discharged into the weigh scale is equal to the difference.

* * * * *